United States Patent [19]
Wardle

[11] Patent Number: 5,522,237
[45] Date of Patent: Jun. 4, 1996

[54] IMMERSION FREEZER

[75] Inventor: David G. Wardle, Tadworth, England

[73] Assignee: The BOC Group plc, Windlesham, England

[21] Appl. No.: 383,382

[22] Filed: Feb. 3, 1995

[30] Foreign Application Priority Data

Feb. 14, 1994 [GB] United Kingdom ................ 94 02 780

[51] Int. Cl.⁶ .................................................... F25D 17/02
[52] U.S. Cl. .................................................. 62/374; 62/63
[58] Field of Search .................................. 62/63, 373, 374

[56] References Cited

U.S. PATENT DOCUMENTS

| | | |
|---|---|---|
| 1,944,857 | 1/1934 | Atwell . |
| 2,522,029 | 5/1951 | Bludeau et al. . |
| 2,787,141 | 4/1957 | Julius ........................................ 62/374 |
| 3,664,146 | 5/1972 | Butts ........................................... 62/63 |

FOREIGN PATENT DOCUMENTS

| | | |
|---|---|---|
| 0109210 | 5/1984 | European Pat. Off. . |
| 0225081 | 6/1987 | European Pat. Off. . |
| 0275114 | 1/1988 | European Pat. Off. . |
| 0611928 | 2/1993 | European Pat. Off. . |
| 2530323 | 1/1984 | France . |
| 1409444 | 10/1975 | United Kingdom . |
| 89/105277 | 4/1989 | WIPO . |

*Primary Examiner*—Ronald C. Capossela
*Attorney, Agent, or Firm*—R. Hain Swope; David A. Drawgert; Larry R. Cassett

[57] ABSTRACT

A substantially U-shaped immersion freezer having an inlet and an outlet and an immersion zone filled with liquid refrigerant. Product to be frozen is passed into the freezer through the inlet and raised by at least one paddle member to the outlet. The resulting frozen product and some liquid refrigerant is then passed out of the outlet to a conveyor having holes provided therein which allow the liquid refrigerant to be drained from the frozen product for recycling back to the inlet side of the freezer.

21 Claims, 2 Drawing Sheets

IMMERSION FREEZER

TECHNICAL FIELD

The present invention relates to immersion freezers and relates particularly, but not exclusively, to immersion freezers suitable for freezing a food product.

BACKGROUND OF THE PRIOR ART

Presently known immersion freezers comprise a perforated conveyor which is, along at least part of its length, dipped into a bath of liquid refrigerant, such as liquid nitrogen. The liquid nitrogen acts to freeze the product before it is removed from the bath. In order to enable the conveyor to be snaked into and out of the liquid nitrogen and to ensure that the residence time of the product under the surface of the liquid nitrogen is sufficient to avoid underchilling, the bath must be somewhat larger than desired. It will be appreciated that the larger the bath the greater the volume of liquid nitrogen and hence the greater the waste thereof. Additionally, handling large quantities of liquid nitrogen safely can be a problem. Furthermore, the conveyor can become blocked with ice and/or small particles of food product and must be removed from the liquid nitrogen for cleaning. Clearly, it is impossible to continue operating the freezer while the conveyor is being cleaned.

An alternative immersion freezer is provided with a continuous belt which passes in one direction through a bath of liquid nitrogen and in the other direction beneath the bath itself, thereby avoiding further immersion in the liquid nitrogen. In this arrangement, it is also known to shape the bath such that the belt drops vertically into the front of the bath and is raised gradually from the rear thereof. Such an arrangement reduces the overall bath volume and hence reduces slightly the problems of liquid waste and safe handling. However, it is obviously impossible to lift the belt out of the liquid nitrogen for cleaning without discontinuing the freezing operation.

An additional problem associated with both of the above mentioned arrangements resides in undesirable liquid 'boil off' which occurs due to the cyclic cooling and heating of the conveyor as it passes into and out of the liquid nitrogen.

SUMMARY OF THE INVENTION

The present invention is generally directed to an immersion freezer in which the conveyor means for transporting the frozen product from the freezer is not immersed in the liquid refrigerant. More specifically, the immersion freezer comprises a U-shaped tube having opposed ends defining an inlet for receiving product to be frozen, and an outlet through which frozen product is extracted from the freezer, said tube further including an immersion zone containing a liquid refrigerant for freezing the product received in the inlet and transportation means for transporting frozen product from the liquid refrigerant to the outlet.

It will be appreciated that the U-shaped tube employed in the present invention makes it possible to significantly reduce the quantity of liquid refrigerant being used. Additionally it is not necessary to provide a conveyor passing into and out of a bath of the liquid refrigerant, thereby avoiding the problems associated therewith.

Preferably, the inlet is provided in the upper surface of the U-shaped tube. This arrangement is particularly advantageous because the product entering the freezer can fall directly to the bottom of the tube and into the immersion zone.

Advantageously, the transportation means comprises at least one paddle member for causing an upward flow of the liquid refrigerant between the bottom of the U-shaped tube and the outlet of the tube to at least assist in the extraction of frozen product from the tube. Preferably, the transportation means comprises a plurality of paddle members circumferentially and/or axially spaced along a shaft extending into the U shaped tube at the outlet end thereof, said shaft being rotatable to cause movement of the paddles and hence movement of the liquid refrigerant upwardly. In a preferred embodiment, the paddle member may have a spiral shape.

Preferably, the freezer further includes extraction means for extracting frozen product from the outlet end of the tube and directing it to a conveyor for conveying the frozen product away from the freezer. Advantageously, the extraction means comprises a chute for scooping frozen product off the surface of the liquid refrigerant at the outlet end of the tube and for directing the frozen product towards the conveyor.

The freezer may further include recycling means for recycling liquid refrigerant extracted with the frozen product from the outlet end back to the inlet side of the tube. In a particularly advantageous arrangement the recycling means comprises the conveyor and a liquid return chute, the conveyor being provided with a plurality of holes therein for the passage of liquid refrigerant therethrough and the return chute being positioned for receiving liquid refrigerant drained from the product being frozen. In a preferred arrangement of the present invention, the conveyor passes between the inlet and the outlet of the U-shaped tube and the liquid return chute is positioned beneath said conveyor.

BRIEF DESCRIPTION OF THE DRAWINGS

The following drawings are illustrative of embodiments of the invention and are not intended to limit the invention as encompassed by the claims forming part of the application.

DETAILED DESCRIPTION OF THE INVENTION

Figure 1:
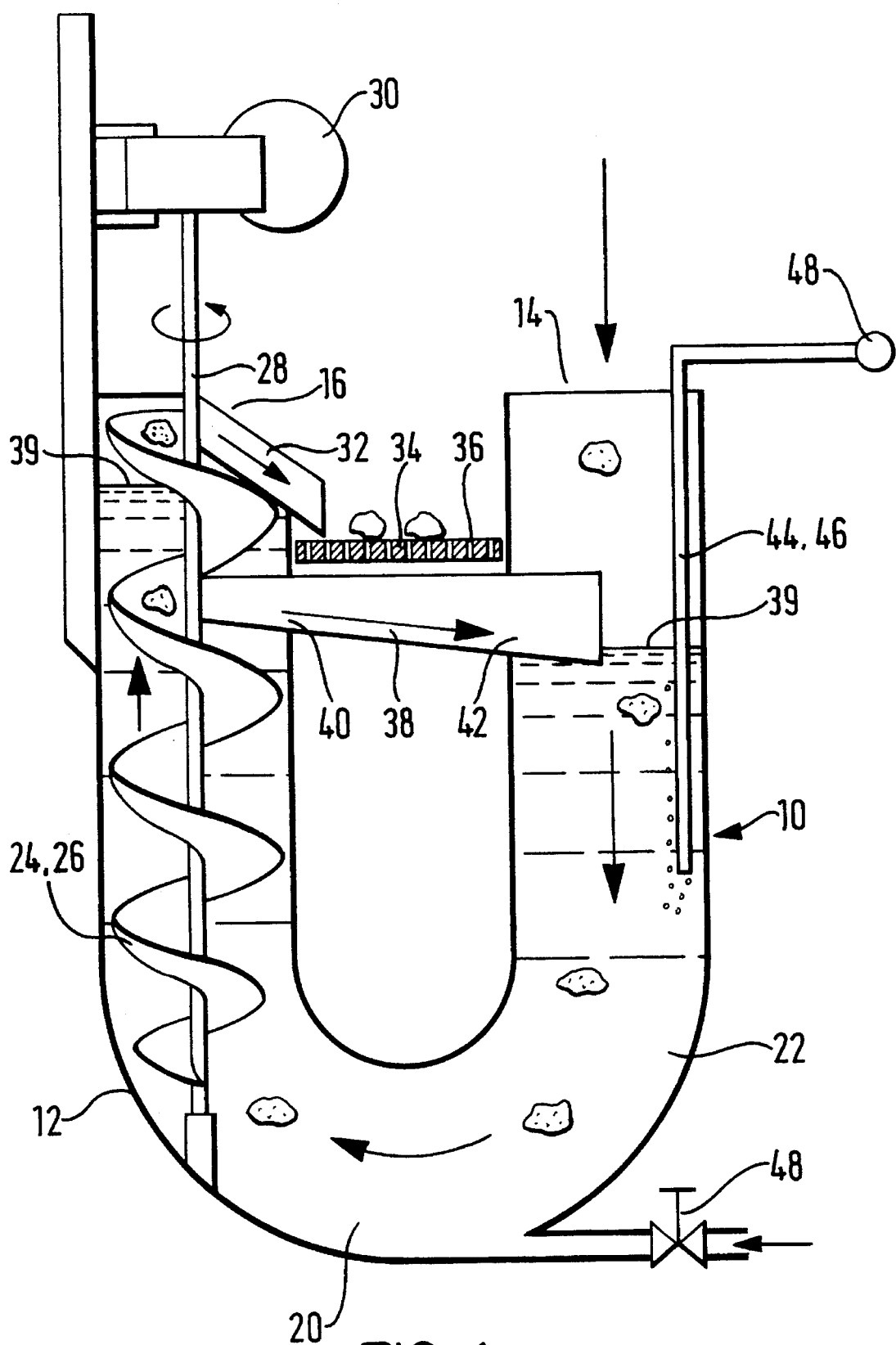
FIG. 1 is a cross-sectional view of an immersion freezer according to the present invention.
Figure 2:
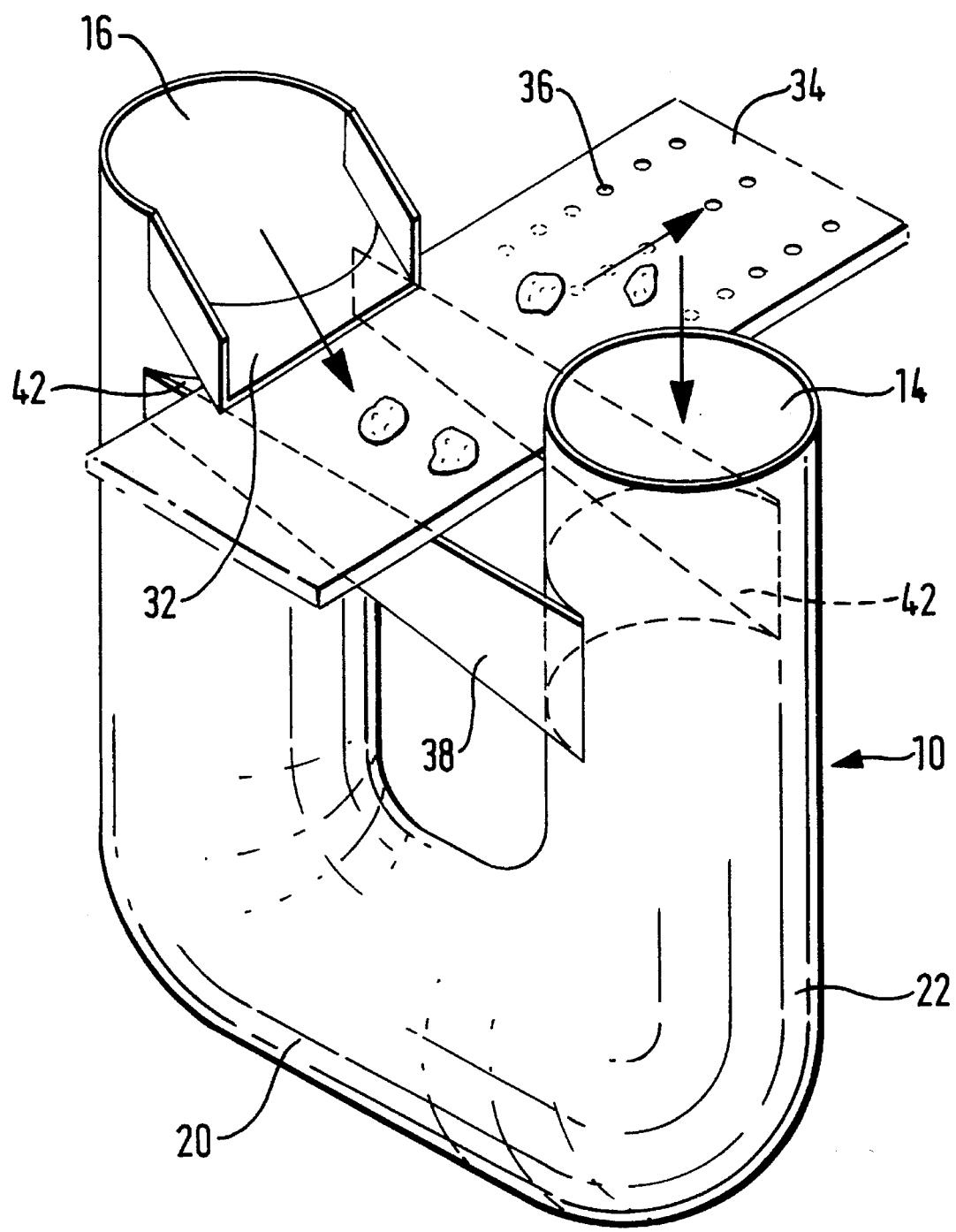
FIG. 2 is an isometric projection of the freezer shown in cross-section in FIG. 1.

Referring now to the drawings in general, but particularly to FIG. 1, an immersion freezer 10 comprises a generally U-shaped tube 12 having an inlet 14 at a first end and an outlet 16 at a second end. The lower portion 18 of the tube 12 acts to define an immersion zone 20 filled with liquid refrigerant such as a liquid cryogen, preferably liquid nitrogen 22. For the sake of convenience, liquid nitrogen will be referred to hereinafter. The inlet 14 and outlet 16 are shown at the end of the U-shaped tube. However, the inlet and outlet can be positioned at the side thereof.

A transportation means 24 in the form of, for example, a spiral paddle member 26 or a plurality of individual paddles circumferentially and axially spaced from each other (not shown) is provided in the outlet side of the tube 12. The paddle member 26 is mounted on a rotatable shaft 28 which is driven by a motor 30. An extraction means in the form of a chute 32 is provided adjacent to the outlet for directing the frozen product from the U-shaped tube towards a conveyor 34, which acts to take the frozen product away from the freezing apparatus. A plurality of holes 36 are provided in the conveyor 34 to allow any liquid nitrogen deposited thereon to pass therethrough and onto a liquid return chute 38 positioned for receiving excess liquid nitrogen from the outlet 16 and returning it to the inlet side 14 of the tube. The chute 38 extends between two holes 40 and 42 provided on the outlet and the inlet sides, respectively.

The paddle member 26 may be constructed to raise the level of liquid nitrogen on the outlet side to a level higher than the level of liquid nitrogen on the inlet side. In this embodiment, the chute 38 can extend generally downwardly between a position just below the surface 39a of the liquid nitrogen at the outlet side to a position just above the surface 39b of the liquid nitrogen at the inlet side. This arrangement allows the chute to return liquid nitrogen to the inlet side without the use of a pump. It will be appreciated that a pump may be employed if desired.

A monitor for measuring the level of liquid nitrogen in the form of, for example, a bubbler and back pressure monitor 44, 46 respectively may be provided. This arrangement facilitates controlling the level of liquid nitrogen which is supplied via a valve 48 connected to a source of liquid nitrogen (not shown).

In operation, incoming, unfrozen food product is dropped into inlet 14 where it sinks to the bottom of the immersion zone 20 partially under gravity and partially due to the action of the transportation means 24 which draws liquid nitrogen and frozen food product upwardly on the outlet side from the lower portion of the tube 12. The frozen food product and liquid nitrogen are raised within the outlet side of the tube above the level 39b of liquid nitrogen at the inlet side. The frozen food product, once raised to the surface 39a at the outlet side, is removed from the surface 39a and directed downwardly along the chute 32 and onto the conveyor 34. Excess liquid nitrogen passes through the holes 36 provided in the conveyor 34 and onto the chute 38 for recycling to the inlet side of the tube. The conveyor 34 transports the frozen food product for further processing away from the freezer.

The present invention provides for the freezing of a food product without having the conveyor pass into and out of a bath of liquid nitrogen. Only excess liquid nitrogen is passed through the conveyor 34 and while this will cause a certain amount of crust freezing it will not be as severe as in prior devices which at least partially immerse the conveyor in the liquid nitrogen.

It will be appreciated that by separating the conveyor 34 from the bath of the liquid nitrogen used for chilling purposes it will be possible to clean the belt without having to drain the immersion zone containing the liquid nitrogen. Additionally, it will be possible to clean the freezing tube 12 without first removing the conveyor 34.

We claim:

1. An immersion freezer comprising an upright U-shaped tube comprised of an inlet for receiving a food product opening into an upper portion of a downward leg of the tube and an upward leg of the tube leading to an outlet for releasing a frozen food product, transportation means contained solely within the upward leg, and a liquid refrigerant contained within the upward and downward legs of the tube thereby defining an immersion zone, whereby food product entering the inlet falls downwardly through the downward leg and then is lifted towards the outlet in part by the transportation means contained solely within the upward leg.

2. The immersion freezer of claim 1 wherein the transportation means comprises at least one paddle member for causing an upward flow of the liquid refrigerant between the immersion zone and the outlet of the tube.

3. The immersion freezer of claim 1 wherein the transportation means comprises a plurality of paddle members circumferentially, axially or both circumferentially and axially spaced along a shaft extending into the upward leg of the U-shaped tube at the outlet thereof, said shaft being rotatable to cause movement of the paddles and hence movement of the liquid refrigerant.

4. The immersion freezer of claim 3 wherein the paddle member is spiral-shaped.

5. The immersion freezer of claim 4 wherein the extraction means also extracts a minor portion of the liquid refrigerant through the outlet of the tube, said freezer further comprising recycling means for recycling the extracted liquid refrigerant to the inlet side of said tube.

6. The immersion freezer of claim 5 wherein the recycling means comprises the conveyor means and a liquid return chute, said conveyor means having a plurality of holes therein for the passage of liquid refrigerant therethrough and said return chute being positioned for receiving liquid refrigerant drained from the frozen product.

7. The immersion freezer of claim 6 wherein the conveyor means is positioned between the inlet and the outlet of the tube and the liquid return chute is positioned beneath said conveyor.

8. The immersion freezer of claim 1 further comprising extraction means for extracting frozen product through the outlet of the tube.

9. The immersion freezer of claim 8 wherein the extraction means comprises a chute for removing the frozen product off of the surface of the liquid refrigerant at the outlet of the tube and for directing said frozen product towards a conveyor means.

10. The immersion freezer of claim 8 further comprising a conveyor means for conveying the frozen product away from said freezer, said extraction means further comprising means for directing a frozen product to the conveyor means.

11. An immersion freezer comprising an upright U-shaped tube comprised of an inlet for receiving a food product opening into a downward leg of the tube and an upward leg of the tube leading to an outlet for releasing a frozen food product, transportation means contained solely within the upward leg, and a liquid refrigerant contained within the upward and downward legs of the tube thereby defining an immersion zone, said transportation means comprising at least one paddle member for causing an upward flow of the liquid refrigerant between the immersion zone and the outlet of the tube, whereby food product entering the inlet falls downwardly through the downward leg and then is lifted towards the outlet in part by the transportation means contained solely within the upward leg.

12. The immersion freezer of claim 11 wherein the U-shaped tube has opposed ends, one of said ends having the inlet and the other of said ends having the outlet.

13. The immersion freezer of claim 11 wherein the inlet is positioned in the upper surface of the U-shaped tube.

14. The immersion freezer of claim 11 wherein the transportation means comprises a plurality of paddle members circumferentially, axially or both circumferentially and axially spaced along a shaft extending into the downward leg of the U-shaped tube at the outlet thereof, said shaft being rotatable to cause movement of the paddles and hence movement of the liquid refrigerant.

15. The immersion freezer of claim 11 wherein the paddle member is spiral-shaped.

16. The immersion freezer of claim 11 further comprising extraction means for extracting frozen product through the outlet of the tube.

17. The immersion freezer of claim 16 wherein the extraction means comprises a chute for removing the frozen product off of the surface of the liquid refrigerant at the outlet of the tube and for directing said frozen product towards a conveyor means.

18. The immersion freezer of claim 16 further comprising a conveyer means for conveying the frozen product away from said freezer, said extraction means further comprising means for directing the frozen product to the conveyer means.

19. The immersion freezer of claim 18 wherein the extraction means also extracts a minor portion of the liquid refrigerant through the outlet of the tube, said freezer further comprising recycling means for recycling the extracted liquid refrigerant to the inlet side of said tube.

20. The immersion freezer of claim 19 wherein the recycling means comprises the conveyer means and a liquid return chute, said conveyer means having a plurality of holes therein for the passage of liquid refrigerant therethrough and said return chute being positioned for receiving liquid refrigerant drained from the frozen product.

21. The immersion freezer of claim 20 wherein the conveyer means is positioned between the inlet and the outlet of the tube and the liquid return chute is positioned beneath said conveyer means.

* * * * *